United States Patent [19]

Jackman

[11] 4,219,572
[45] Aug. 26, 1980

[54] SUSPENSION STABILIZATION OF MGO IN LIQUID FEED SUPPLEMENTS USING XANTHAN GUM

[75] Inventor: Kristina R. Jackman, San Diego, Calif.

[73] Assignee: Merck & Co., Inc., Rahway, N.J.

[21] Appl. No.: 5,055

[22] Filed: Jan. 22, 1979

[51] Int. Cl.$^2$ .................. A23K 1/02; A23K 1/175; A23K 1/22
[52] U.S. Cl. .................. 426/69; 426/74; 426/330; 426/573; 426/658; 426/807
[58] Field of Search .............. 426/69, 330, 573, 807, 426/74, 658

[56] References Cited

U.S. PATENT DOCUMENTS

| | | | |
|---|---|---|---|
| 3,692,898 | 9/1972 | Gorman et al. | 424/158 |
| 3,794,740 | 2/1974 | Achorn et al. | 426/69 |
| 4,089,979 | 5/1978 | Jackson | 426/573 X |

OTHER PUBLICATIONS

Kelco Technical Bulletin I, No. 27, Kelco Div. of Merck & Co. Inc., Jun. 1976.
Kelco Technical Bulletin AF, No. 1, Kelco Div. of Merck & Co. Inc., Aug. 1978.
Proceedings AFMA Liquid Feed Supplements–Conference, Sep. 7-8, 1977, pp. 1, 3, 5.

*Primary Examiner*—Robert A. Yoncoskie
*Attorney, Agent, or Firm*—Gabriel Lopez; Hesna J. Pfeiffer; Julian S. Levitt

[57] ABSTRACT

A high (4% to 6%) magnesium-containing liquid feed supplement is provided which has stable suspension properties over 1-8 weeks and which is flowable at 20°-30° F. and higher.

6 Claims, No Drawings

SUSPENSION STABILIZATION OF MGO IN LIQUID FEED SUPPLEMENTS USING XANTHAN GUM

BACKGROUND OF THE INVENTION:

This invention relates to a liquid feed supplement having a high level of MgO (up to 6%) but which has good suspension stability and no gelation and is stable and flowable. The use of xanthan gum as the suspending agent for the composition is disclosed.

Liquid feed supplements (LFS) contain the basic components of urea, molasses, and phosphoric acid and/or ammonium polyphosphate; more generally, a source of nitrogen, phosphorus and sugars. When these components are all soluble, the total solids remain uniformly distributed throughout the composition. However, minerals or insoluble, inorganic supplements sometimes show incompatibilities by precipitating out, or setting up in the LFS into an immobile gel-like mixture. In particular, magnesium oxide, which is a valuable nutrient to prevent or cure the cattle disease of grass tetany, is also insoluble and accordingly, very difficult to formulate in an LFS without settling. Also, MgO can cause gelation, in combination with nitrogen and phosphorous-containing ingredients, so that the LFS is not flowable and cannot be poured.

The difficulties of working with magnesium oxide are many. It is not palatable when mixed into dry feed or administered in block form. MgO mesh sizes and amount of impurities can limit use; also the MgO degree of reactivity can accelerate gelation. However, the advantage of MgO is that it is inexpensive with a high proportion of active magnesium. Accordingly, it has been desired to incorporate it into an LFS composition.

The therapeutic level of MgO in LFS is between 4 and 6%. Levels as low as 2% (preventative dosage) are more easily formulated; but at these levels, not enough MgO gets into the cow to cure grass tetany.

It has now been demonstrated that up to 6% MgO in LFS can be prepared using xanthan gum at about 0.025–0.2% concentration, or preferably 0.05–0.1%. This composition is stable for 1–8 weeks, and flowable at temperatures as low as 20°–30° F. These high levels of MgO have not been possbile heretofore with the regular LFS compositions employed in the present domestic range cattle feed operations.

Before giving a detailed description of this invention, a few general terms should be explained.

Liquid feed supplements (LFS) describe a liquid vehicle plus one or more additives suitable for animal feeding. Sugars, non-protein-nitrogen, and phosphorus sources are generally present. Molasses, urea, fermentation liquors, distiller's solubles, ammonium polyphosphate, phosphoric acid, are more commonly used. A report by Pfizer, Agricultural Division, "Liquid Supplements for Livestock Feeding", New York, 1969, Technical Data Report No. 6, discusses many of the currently used compositions as well as a survey of the literature. Any and all of the compositions can be generally used in this invention.

Magnesium oxide (MgO) is a widely available inorganic magnesium source, in many different forms for different uses. Generally, an MgO intended for animal food use is preferred, and a number of suppliers are available. The Animag$^R$, feed grade Mg0 200 mesh grade supplied by Martin Marietta was most effective in this invention, but undoubtedly other grades or forms of MgO will be operable in the practice of this invention. Generally, a relatively pure, fine-mesh highly calcined magnesium oxide product should be used. The level of MgO in the final LFS is (weight %) generally, 4–6%.

The xanthan gum is a heteropolysaccharide gum isolated from the fermentation broth of many organisms of the *Xanthomonas* species, and is also commercially available in a suitable form for practice in this invention. One particularly valuable form is Kelflo$^R$ brand of xanthan gum, available for Kelco Division, MERCK & CO., Inc., San Diego, California. The levels of xanthan gum necessary to obtain the homogenous stable LFS containing up to 6% MgO are generally about 0.1% (weight %), and can be within the range of 0.025–0.2%. These ranges translate to about 2 pounds of xanthan gum per ton LFS, generally between about ½ to 4 pounds xanthan gum per ton LFS.

The method of formulating the LFS containing MgO, and xanthan gum, is generally that used for formulating any LFS. The MgO is best dispersed by slurrying in water or liquid before other ingredients are added, to minimize the lumping problems which can occur if it is added dry at the end of the mixing.

An example of a very good LFS composition of this invention follows:

| Ingredients | % |
|---|---|
| 79.5% Brix cane molasses | 60.4 |
| water | 22.6(20.6, 18.6) |
| 50% urea liquor | 10.5 |
| 75% phosphoric acid (feed-grade, FMC Corp) | 2.5 |
| Animag$^R$ magnesium oxide (200 mesh, Martin Marietta) | 2 (4, 6) |
| concentrated sulfuric acid | 1.0 |
| vitamin/mineral slurry (1% mineral premix, 1% vitamin A, D, E emulsion and 98% water) | 1.0 |
| xanthan gum | varied |

The results were as follows.

| | Viscosity Data, 60 rpm 74° F. (cp) | | | |
|---|---|---|---|---|
| | initial | 4 wks | 8 wks | 8wks (35° F.) |
| 2% MgO | | | | |
| 0 lb. xanthan gum | 69 | 74 | 76 | 276 |
| 1 lb. xanthan gum (0.05%) | 173 | 245 | 224 | 498 |
| 2 lb. xanthan gum (0.1%) | 381 | 450 | 410 | 800 |
| 4% MgO | | | | |
| 0 lb. xanthan gum | 93 | 128 | 144 | 352 |
| 1 lb. xanthan gum | 212 | 320 | 328 | 720 |
| 2 lb. xanthan gum | 406 | 580 | 595 | 1290 |
| 6% MgO | | | | |
| 0 lb. xanthan gum | 88 | 144 | 174 | 328 |
| 1 lb. xanthan gum | 344 | 535 | 590 | 900 |
| 2 lb. xanthan gum | 640 | 1010 | 900 | 1715 |

Taking these viscosity data alone, all are acceptable. More importantly, MgO content was measured by analyzing a 10% portion of the LFS at the top and bottom of 1½"×13½" sediment tubes for magnesium content. Results are summarized below:

|  | % Mg (10% portion of LFS) | | | | | | | |
|---|---|---|---|---|---|---|---|---|
|  | 2 weeks | | 4 weeks | | 6 weeks | | 8 weeks | |
|  | Top | Bottom | Top | Bottom | Top | Bottom | Top | Bottom |
| 2% MgO Animag[R] | | | | | | | | |
| 0 lb KFLO | 0.54 | 1.23 | 0.47 | 1.22 | 0.49 | 1.43 | 0.48 | 1.34 |
| 1 lb KFLO | 0.74 | 0.99 | 0.57 | 1.07 | 0.68 | 1.27 | 0.55 | 1.16 |
| 2 lb KFLO | 0.99 | 1.05 | 1.03 | 1.05 | 1.23 | 1.21 | 1.06 | 1.15 |
| 4% MgO Animag[R] | | | | | | | | |
| 0 lb KFLO | 0.7 | 2.67 | 0.51 | 2.29 | 2.32 | 0.74 | 0.74 | 2.39 |
| 1 lb KFLO | 1.9 | 2.34 | 1.86 | 2.02 | 1.92 | 2.26 | 1.8 | 1.96 |
| 2 lb KFLO | 2.37 | 2.13 | 2.11 | 2.24 | 1.96 | 2.00 | 2.19 | 2.06 |
| 6% MgO Animag[R] | | | | | | | | |
| 0 lb KFLO | 0.61 | 2.67 | 0.54 | 3.32 | 0.79 | 2.52 | 0.66 | 3.27 |
| 1 lb KFLO | 2.17 | 2.91 | 1.39 | 2.86 | 2.06 | 2.42 | 1.61 | 3.22 |
| 2 lb KFLO | 3.15 | 3.09 | 3.10 | 3.12 | 2.54 | 2.34 | 3.15 | 3.2 |

Calculations of the Mg, % separation between the two top and bottom layers (10%) indicates that 2 lb. xanthan gum in a 2% MgO LFS results in a % separation of less than 5% over 8 weeks, a 1 lb. xanthan gum level, the % separation is less than 50 %; with no xanthan gum, the difference is 75% at 2 weeks and approaching 90% at 8 weeks. For a 4% MgO LFS, both 1 lb. and 2 lb. xanthan gum formulations have under 20% differences through the 8 weeks; no xanthan content has over 80-90% separation. For the 6% MgO, LFS 2 lb. xanthan gum provides excellent suspension stability with the percent separation less than 5% for the 8 weeks. Visual stability was generally about 5-10% top separation, or less, for either of the levels of xanthan gum at all levels of MgO, but was 10-40% top separation for the controls, containing no xanthan gum.

What is claimed is:

1. A method of suspension stabilizing about 4 to about 6 weight percent fine-mesh, highly calcined magnesium oxide in a non-gelling ruminant liquid feed supplement comprising non-protein nitrogen, a phosphorus source, and an energy source, which comprises adding 0.025-0.2% by weight xanthan gum to said ruminant liquid feed supplement 2. The method of claim 1, where the xanthan gum is 0.05-0.1% by weight.

3. A ruminant liquid feed supplement composition which is suspension stable for 6-8 weeks and flowable at 20°-30° F. comprising non-protein nitrogen, a phosphorus source, an energy source, about 4 to about 6 weight percent fine mesh, highly calcined magnesium oxide, and 0.025-0.2% xanthan gum.

4. A composition of claim 3 which comprises 0.05-0.1% xanthan gum.

5. A composition of claim 3 wherein the energy source is cane molasses, the non-protein nitrogen is urea, and the phosphorus source is phosphoric acid.

6. The composition of claim 5 wherein the magnesium oxide is a feed grade 200 mesh magnesium oxide.

* * * * *